United States Patent
Park et al.

(10) Patent No.: US 10,289,919 B2
(45) Date of Patent: May 14, 2019

(54) VEHICLE AND METHOD OF CONTROLLING THE SAME

(71) Applicant: HYUNDAI MOTOR COMPANY, Seoul (KR)

(72) Inventors: Jung Mi Park, Anyang-si (KR); Jia Lee, Goyang-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 35 days.

(21) Appl. No.: 14/958,553

(22) Filed: Dec. 3, 2015

(65) Prior Publication Data

US 2016/0217332 A1    Jul. 28, 2016

(30) Foreign Application Priority Data

Jan. 27, 2015    (KR) .................... 10-2015-0012440

(51) Int. Cl.
| | |
|---|---|
| *G06F 3/16* | (2006.01) |
| *G06K 9/00* | (2006.01) |
| *H04N 7/18* | (2006.01) |
| *B60W 40/02* | (2006.01) |

(52) U.S. Cl.
CPC ......... *G06K 9/00791* (2013.01); *B60W 40/02* (2013.01); *G06F 3/167* (2013.01); *H04N 7/181* (2013.01); *G06T 2207/30252* (2013.01)

(58) Field of Classification Search
CPC .... G06K 9/00791; G06F 3/167; H04N 7/181; B60W 40/02; G06T 2207/30252
See application file for complete search history.

(56) References Cited

U.S. PATENT DOCUMENTS

| | | | | |
|---|---|---|---|---|
| 8,427,288 | B2* | 4/2013 | Schofield | 340/425.5 |
| 9,195,290 | B2* | 11/2015 | Siliski | G01C 21/265 |
| 9,315,151 | B2* | 4/2016 | Taylor | B60R 1/00 |
| 2004/0243307 | A1* | 12/2004 | Geelen | G01C 21/3635 |
| | | | | 701/469 |
| 2006/0173615 | A1* | 8/2006 | Pinkus | G01C 21/362 |
| | | | | 701/454 |
| 2007/0090311 | A1* | 4/2007 | Pallaro | B60Q 1/1423 |
| | | | | 250/574 |

(Continued)

FOREIGN PATENT DOCUMENTS

| | | |
|---|---|---|
| JP | 2001-203918 A | 7/2001 |
| JP | 2009-267562 A | 11/2009 |

(Continued)

OTHER PUBLICATIONS

McVeigh-Schultz et al. "Vehicular lifelogging: new contexts and methodologies for human-car interaction." CHI'12 Extended Abstracts on Human Factors in Computing Systems. ACM, 2012. (Year: 2012).*

(Continued)

*Primary Examiner* — Katrina R Fujita
(74) *Attorney, Agent, or Firm* — Morgan Lewis & Bockius LLP

(57) ABSTRACT

A vehicle includes an image capturer configured to acquire a driving image of surrounding environment of the vehicle, and a processor configured to acquire additional information related to the driving image and to store the driving image and the additional information.

17 Claims, 12 Drawing Sheets

(56) References Cited

U.S. PATENT DOCUMENTS

| | | | | |
|---|---|---|---|---|
| 2011/0313597 | A1* | 12/2011 | Wilson | G01C 23/00 |
| | | | | 701/3 |
| 2012/0323449 | A1* | 12/2012 | Kim | B62D 41/00 |
| | | | | 701/49 |
| 2013/0251209 | A1* | 9/2013 | Kim | G06K 9/00791 |
| | | | | 382/106 |
| 2014/0320637 | A1* | 10/2014 | Yi | B60R 1/00 |
| | | | | 348/118 |
| 2014/0375813 | A1* | 12/2014 | Lee | G08G 1/017 |
| | | | | 348/148 |
| 2015/0227965 | A1* | 8/2015 | Drysch | G06F 16/51 |
| | | | | 705/14.45 |
| 2016/0090039 | A1* | 3/2016 | Tan | G06K 9/00791 |
| | | | | 348/148 |
| 2016/0155150 | A1* | 6/2016 | Zhang | G06Q 30/0261 |
| | | | | 705/14.58 |
| 2016/0275873 | A1* | 9/2016 | Taylor | G06F 3/04842 |

FOREIGN PATENT DOCUMENTS

| | | |
|---|---|---|
| KR | 10-0909675 B1 | 7/2009 |
| KR | 10-2012-0116531 A | 10/2012 |
| KR | 10-2014-0089036 A | 7/2014 |
| KR | 10-2014-0131760 A | 11/2014 |

OTHER PUBLICATIONS

Office Action dated Nov. 26, 2015 in related Korean Application No. 10-2015-0012440 (English translation provided).

* cited by examiner

VEHICLE AND METHOD OF CONTROLLING THE SAME

CROSS-REFERENCE TO RELATED APPLICATION

This application claims the benefit of priority to Korean Patent Application No. 10-2015-0012440, filed on Jan. 27, 2015, in the Korean Intellectual Property Office, the disclosure of which is incorporated herein by reference.

TECHNICAL FIELD

The present disclosure relates to a vehicle for acquiring a driving image of the vehicle, and a method of controlling the same.

BACKGROUND

In recent years, a vehicle employs a system to provide images of surrounding environments through a camera for the convenience or safety of a vehicle driver. The cameras may be installed at a front side, a rear side, and lateral sides of a vehicle body such that the driver can easily and safely drive the vehicle.

Each image acquired by the vehicle is separately obtained and processed from other driving information, and thus there exists a need for technology capable of using the images of the surrounding environments in association with other configurations.

SUMMARY

An aspect of the present inventive concept provides a vehicle capable of capturing a driving image of the vehicle and providing the captured driving image together with additional information, and a method of controlling the same.

In accordance with an embodiment in the present disclosure, a vehicle includes an image capturer and a processor. The image capturer may be configured to acquire a driving image of a surrounding environment of the vehicle. The processor may be configured to acquire additional information related to the driving image and to store the driving image and the additional information.

The image capturer may include at least one of a front camera configured to acquire a front view image of the vehicle, a rear camera configured to acquire a rear view image of the vehicle, a side camera configured to acquire a side view image of the vehicle, and a black box camera for the vehicle.

The vehicle may further include a speech recognizer configured to recognize a speech. The processor may control the acquiring of the driving image according to a result of the speech recognition of the speech recognizer.

The additional information may include at least one of image capturing environment information about the surrounding environment in which the driving image is captured and vehicle state information about a state in which the driving image is captured.

The image capturing environment information may include at least one of a location in which the driving image is captured and a time in which the driving image is captured.

The processor may perform tagging on the driving image.

The vehicle state information may include at least one of a revolutions per minute (RPM) of an engine, a state of a transmission, a vehicle speed, an on/off state of a lamp, the temperature of coolant, fuel information, travel distance information, a tire pressure, and oil state information.

The vehicle may further include a speech receiver configured to receive a speech of a user. The processor may store the speech of the user received through the speech receiver together with the driving image.

The vehicle may further include a display configured to provide a user with the driving image and the additional information.

The processor may monitor a sign of abnormalcy in the vehicle. When the sign of abnormalcy is detected, the processor may capture a driving image of the vehicle.

The processor may transmit the driving image and the additional information to a service server.

The vehicle may further include a communicator configured to transmit the driving image and the additional information to an external apparatus.

The processor may edit the driving image according to a characteristic of an external apparatus and transmits the edited image.

In accordance with another embodiment in the present disclosure, a vehicle includes an image capturer and a processor. The image capturer may be configured to capture a driving image of a surrounding environment of the vehicle when a sign of abnormalcy is detected. The processor may be configured to acquire additional information related to the driving image and to store the acquired additional information together with the driving image.

In accordance with another embodiment in the present disclosure, a method of controlling a vehicle includes: acquiring a driving image of a surrounding environment of the vehicle; acquiring additional information related to the driving image; and storing the driving image and the additional information.

The step of acquiring the driving image may include at least one of: acquiring a front view image of the vehicle on driving by using a front camera; acquiring a rear view image of the vehicle on driving by using a rear camera; acquiring a side view image of the vehicle on driving by using a side camera; and acquiring an image of the vehicle on driving by using a black box camera provided in a black box.

The method may further include: recognizing a speech of a user; and initiating the acquiring of the driving image according to a result of the speech recognition.

The acquiring of the additional information may include at least one of: acquiring image capturing environment information obtained when the driving image is captured; and acquiring vehicle state information obtained when the driving image is captured.

The step of acquiring the additional information may include receiving a speech of a user; and the storing of the driving image and the additional information comprises storing the received speech of the user together with the driving image.

The method may further include displaying the driving image and the additional information.

The method may further include: monitoring a sign of abnormalcy in the vehicle; and initiating the capturing of a driving image when the sign of abnormalcy is detected.

The method may further include transmitting the driving image and the additional information to an external apparatus.

The method may further include editing the image of the vehicle on traveling according to a characteristic of the external apparatus and transmits the edited image.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
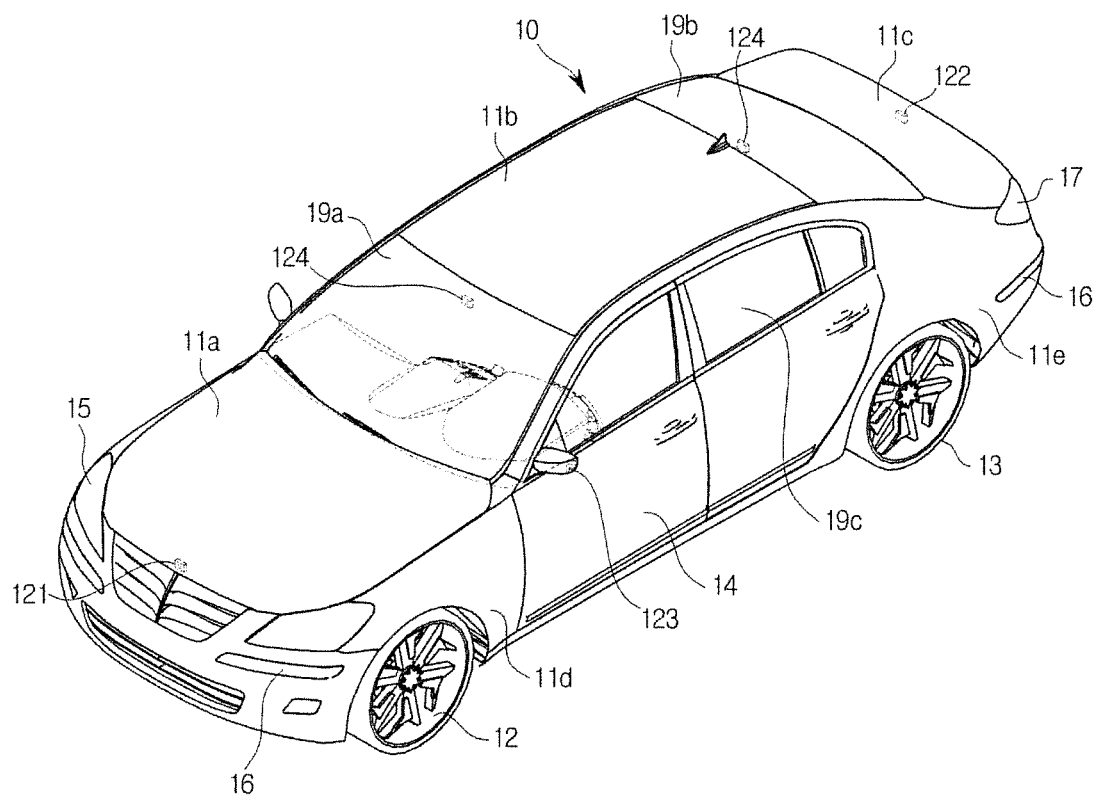
FIG. 1 is a view schematically illustrating a vehicle in accordance with an embodiment in the present disclosure.

Reference will now be made in detail to the embodiments in the present disclosure, examples of which are illustrated in the accompanying drawings, wherein like reference numerals refer to like elements throughout.

Figure 2:
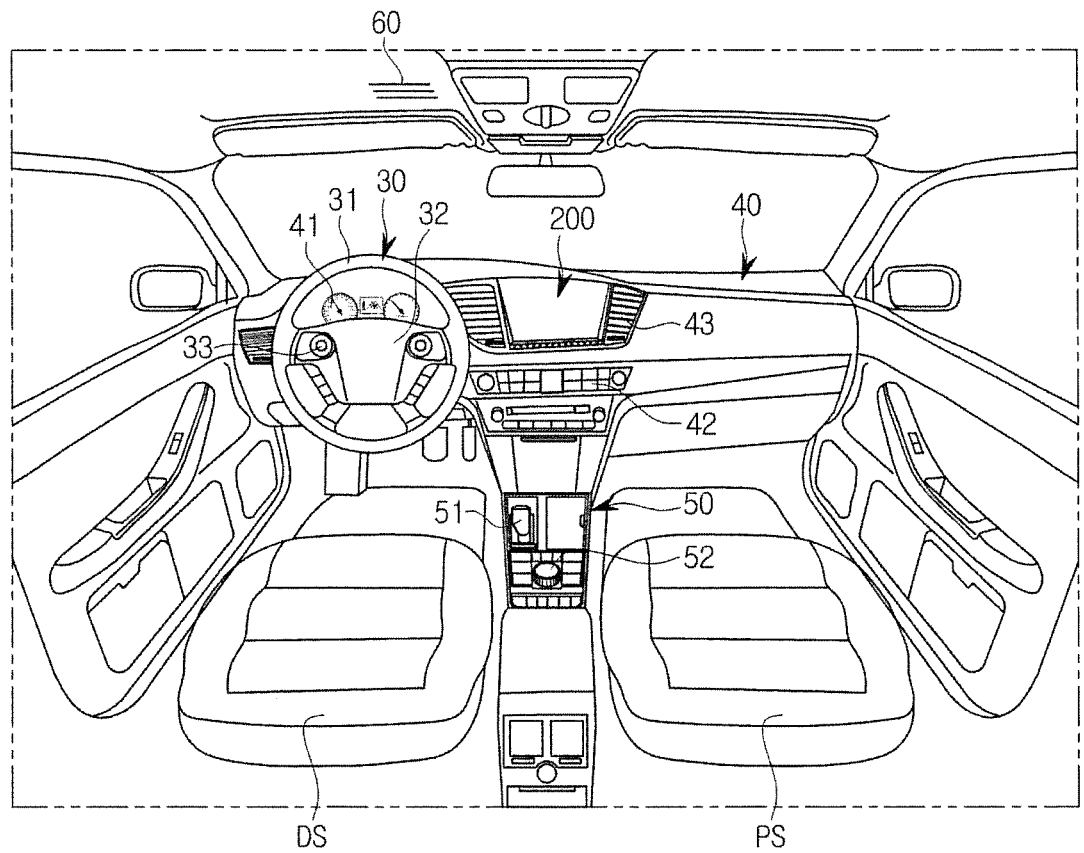
FIG. 2 is a view schematically illustrating an interior of a vehicle in accordance with an embodiment in the present disclosure.

FIG. 1 is a view schematically illustrating a vehicle in accordance with an embodiment in the present disclosure, and FIG. 2 is a view schematically illustrating the interior of a vehicle in accordance with an embodiment in the present disclosure.

Referring to FIG. 1, a vehicle 10 includes a vehicle body 11 forming the external appearance of the vehicle 10 and wheels 12 and 13 moving the vehicle 10.

The vehicle body 11 includes: a hood 11a protecting various apparatus required for driving the vehicle 10, for example, an engine; a roof panel 11b forming an interior space of the vehicle 10; a trunk lid 11c for providing an accommodation space; and front fenders 11d and quarter panels 11e provided at sides of the vehicle 10. In addition, a plurality of doors 14 are hingedly provided at sides of the vehicle body 11.

A front window 19a is provided between the hood 11a and the roof panel 11b to provide a front view of the vehicle 10, a rear window 19b is provided between the roof panel 11b and the trunk lid 11c to provide a rear view of the vehicle 10. A side window 19c is provided at an upper portion of the door 14 to provide a side view of the vehicle.

In addition, a head lamp 15 is provided at a front portion of the vehicle 10 to radiate light in a heading direction of the vehicle 10. In this case, the head lamp 15 may operate in a low beam mode in which light is radiated at a short distance from the vehicle 10 (for example, a range within 30 m) or in a high beam mode in which light is radiated at a long distance from the vehicle 10 (for example, a range within 100 m). In addition, turn signal lamps 16 are provided at a front portion and a rear portion of the vehicle 10 to signal the heading direction of the vehicle 10. The vehicle 10 may indicate the corresponding heading direction of the vehicle 10 by flicking the turn signal lamp 16. A tail lamp 17 is provided at a rear portion of the vehicle 10 to indicate a gear transmission state and a brake operation state of the vehicle 10.

In addition, a front camera 121 is installed at a front side of the vehicle 10 to acquire an image of a front of the vehicle 10, a rear camera 122 is installed at a rear side of the vehicle 10 to acquire an image of a rear of the vehicle 10, a side camera 123 is installed at a lateral side of the vehicle 10 to acquire an image of a side of the vehicle 10, and a black box camera 124 is installed at an inside of the vehicle 10.

Referring to FIG. 2, the vehicle 10 includes: seats on which a rider is seated; a steering wheel 30 manipulating the heading direction of the vehicle 10; a dash board 40 on which various instrumentations are provided to control an operation of the vehicle 10 and to display operation information about the vehicle 10; and a gear box 50 provided at a lower side of the dash board 30.

The seat may include a driver seat DS on which a driver is seated, a passage seat PS on which a passenger is seated, and a back seat (not shown) positioned at a rear portion in the vehicle 10.

The steering wheel 30 includes a rim 31 grasped by the driver and a spoke 32 connecting to the rim 31 to a hub of a steering apparatus of the vehicle 10 that is disposed on a rotating shaft for steering. The driver manipulates the rim 31 to rotate the spoke 32 and to change the heading direction of the wheels, thereby adjusting the driving direction of the vehicle 10.

In order to receive a speech of a user/driver, a speech receiver 60 is provided at a ceiling of the driver seat DS. The speech receiver 60 may include a microphone converting a speech signal of the user into an electrical signal. In addition, the speech receiver 60 may include a noise remover filter removing noise from a speech signal.

In addition, the steering wheel 30 may further include a first manipulator 33. The user may control a setting of the vehicle or may input a control command to the vehicle by using the first manipulator 33. For example, the user may initiate speech recognition by proving the first operator 33 with an input. In addition, the first operator may include an input member, such as a push button or a membrane button, and a dial.

The dash board 40 may include: a cluster 41 indicating a traveling speed, the engine revolution per minute or the level of fuel of the vehicle 10; a center fascia 42 provided with a manipulating apparatus to adjust an audio/video apparatus and an air conditioner; and a blower port 43 to introduce air to the inside of the vehicle 10.

At a lower side of the center fascia 42, the gear box 50 is provided in which the gear apparatus is accommodated. A gear rod 51 protrudes from the gear box 50 to perform change shift.

In addition, the gear box 50 has a second manipulator 52 allowing the user to input various commands to manipulate various functions of the vehicle 10. The second manipulator 52 may include at least one of a knob, a mechanical button, a joystick, a lever, a track ball, a manipulation wheel, an operation sensor, an object detection sensor and a touch sensor. The second manipulator 52 according to the present disclosure is not limited thereto, and may include various input device.

The center fascia 42 may be provided at a center thereof with a display 200. The display 200 may provide an interface to input a control command to the vehicle 10. The display 200 may be implemented using a liquid crystal display (LCD) panel, a light emitting diode (LED) panel, or an organic light emitting diode (OLED) panel. In addition, the display 200 may be provided with a touch panel to receive a touch input of the user.

Figure 3:
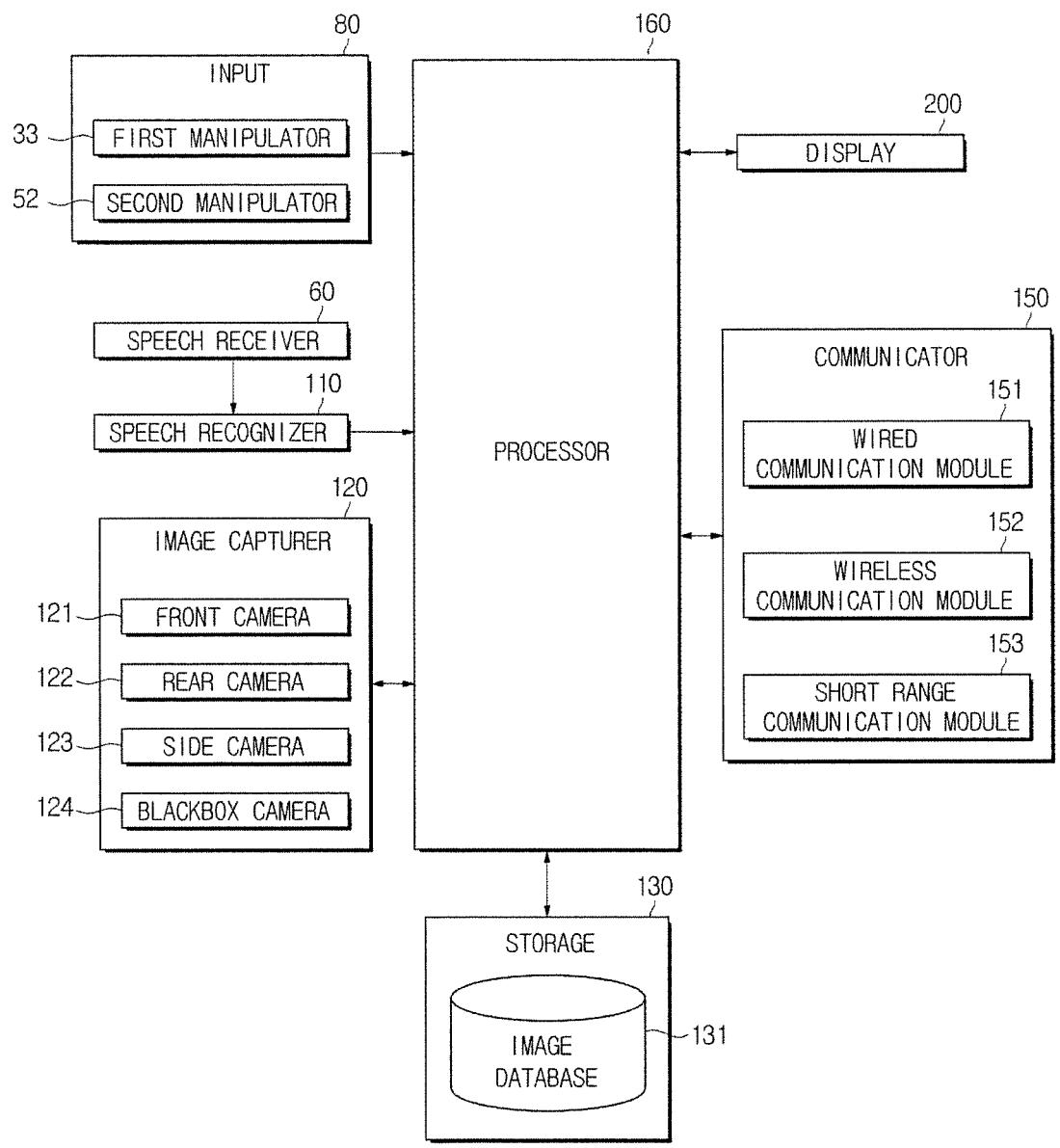
FIG. 3 is a control block diagram illustrating a vehicle in accordance with an embodiment in the present disclosure.
Figure 4:
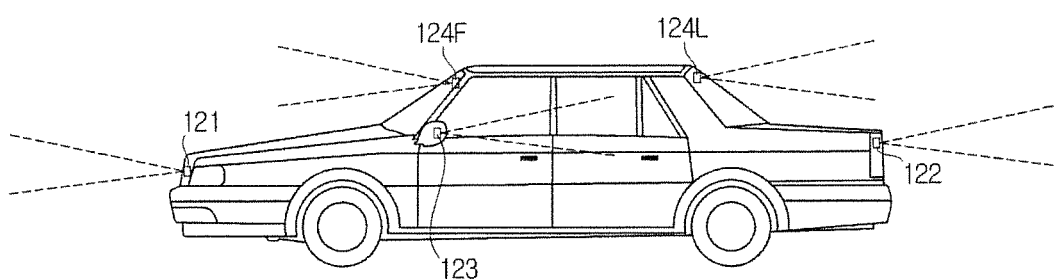
FIG. 4 is a view illustrating image acquiring apparatuses provided at a vehicle in accordance with an embodiment in the present disclosure.

FIG. 3 is a control block diagram illustrating a vehicle in accordance with an embodiment in the present disclosure, and FIG. 4 is a view illustrating image acquiring apparatuses provided at a vehicle in accordance with an embodiment of the present disclosure.

Referring to FIG. 3, the vehicle 10 according to an embodiment in the present disclosure includes an input 80 to receive a control command from the user, a speech recognizer 110 to recognize a speech of the user, an image capturer 120 configured to acquire a driving image of the vehicle 10, the display 200 displaying a user interface, a communicator 150 communicating with an external apparatus, a storage 130 storing data related to the driving of the vehicle 10, and a processor 160 processing and storing the driving image of the vehicle 10.

The driving image may represent images of inside and outside of the vehicle 10 acquired when the vehicle 10 stops or driving as long as the image is acquired by the vehicle 10. In addition, the driving image may be a moving image or a still image.

The input 80 receives a control command from the user, and outputs an electrical signal corresponding to the input control command. For example, the user may input an image capturing initiation command or an image capturing termination command through the input 80. In addition, through the input 80, the user may select a driving image of the vehicle 10 to be displayed on the display 200, or may select an external apparatus to which the driving image is transmitted.

The speech recognizer 110 recognizes a speech of the user, and outputs the result of speech recognition. The speech of the user input through the speech receiver 60 is input to the speech recognizer 110. The speech recognizer 110 recognizes the input speech of the user, and outputs the speech in the form recognizable by the processor 160 and responsive to the processor 160.

In detail, the speech recognizer 110 extracts an actual speech section by detecting a start point and an end point in which phonetic information is included, and extracts a feature vector by using a cepstrum, linear predictive coefficient (LPC), Mel-frequency cepstral coefficient (MFCC) or filter bank energy. The speech recognizer 110 may apply a pre-stored acoustic model or a language model to the feature vector extracted from the speech section, to recognize the speech of the user. The acoustic model is obtained by modeling a feature vector of a phoneme, and is used to determine which phoneme corresponds to the feature vector extracted from the speech section. The language model is obtained by modelling a language sequence of words or syllables, and reduces errors in speech recognition by reducing acoustic ambiguity.

The speech recognizer 110 may recognize speech of the user by applying other speech recognition algorithms or speech recognition engines that have been generally known in the art or that will be developed in the future.

A user may control the vehicle 10 by user's speech through the speech recognizer 110. In detail, the speech recognizer 110 recognizes a speech of a user and outputs the result of speech recognition, and the processor 160 operates based on the output result of speech recognition.

That is, the user may initiate or terminate acquiring of a driving image of surrounding environments through the speech recognition without a complicated manipulation. For example, the user may vocalize words "capture an image", to command an initiation of image capturing, or vocalize words "terminate an image", to command a termination of image capturing.

Figure 5:
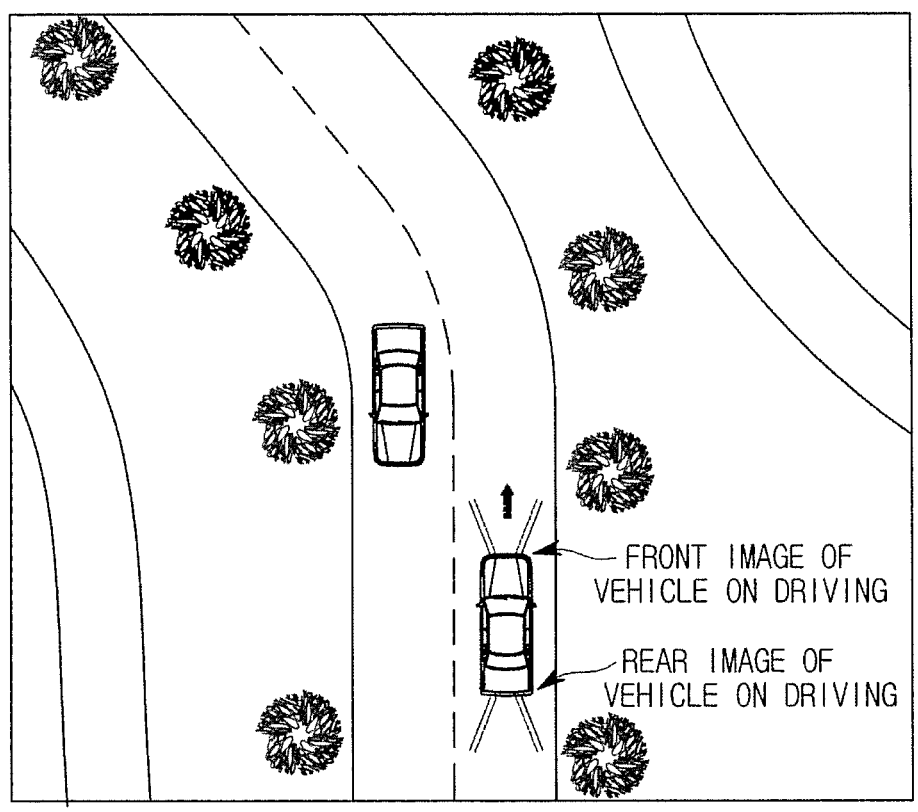
FIG. 5 is a view illustrating a case of acquiring a driving image a vehicle in accordance with an embodiment in the present disclosure.

FIG. 5 is a view illustrating a case of acquiring a driving image in accordance with an embodiment in the present disclosure.

Figure 6:
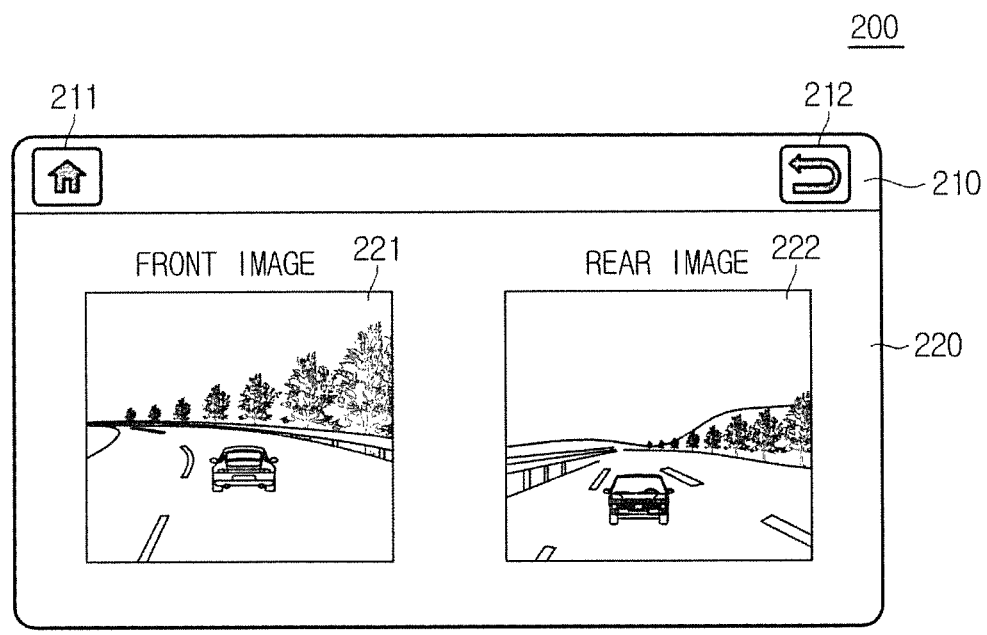
FIG. 6 is a view illustrating an example of a display screen on which a driving image of a vehicle is displayed.

FIG. 6 is a view illustrating an example of a display screen on which a driving image of a vehicle is displayed.

Referring to FIGS. 1, 3 and 4, the image capturer 120 captures a driving image of the vehicle 10. The image capturer 120 may include a plurality of cameras to acquire driving images of the vehicle 10. The image capturer 120 may capture the driving image of the vehicle 10 according to control of the processor 160. The acquired driving image may be transmitted to the processor 160 or may be stored in the storage 130.

The image capturer 120 may acquire a driving image of the vehicle 10 by using a camera provided at the vehicle 10. The image capturer 120 may include at least one of the front camera 121 to acquire an image of a front view, the rear camera 122 to acquire an image of a rear view, the side camera 123 to acquire an image of a side view, and the black box camera 124. The black box camera 124 is provided at a vehicle-purpose black box, and may include a front black box camera 124F and a rear black box camera 124L.

The image capturer 120 may capture a plurality of driving images by using a plurality of cameras. For example, as shown in FIG. 5, the image capturer 120 may acquire a plurality of driving images by simultaneously capturing the front view and the rear view.

As shown in FIG. 6, the driving image of the vehicle 10 captured by the image capturer 120 may be displayed through the display 200. A screen of the display 200 may include a state display region 210 and an image display region 220. The state display region 210 may display a home icon 211 to move to a home screen and a previous icon 212 to return to a previous state.

The information display region 220 may display a plurality of driving images of the vehicle 10. For example, when a front image 221 and a rear image 222 of the vehicle 10 on driving are simultaneously acquired, the image display region 220 may display the front image 221 and the rear image 222. The user may select the front image 221 or the rear image 222 of the vehicle 10 on driving, to select an image to be stored.

The image capturer 120 may perform a pre-processor on the captured driving image of the vehicle 10. In detail, the image capturer 120 may remove noise from the driving image of the vehicle 10, or calibrate screen image distortion generated on the driving image of the vehicle 10.

In addition, the image capturer 120 may convert a driving image into a preset format, or perform an image compression on a driving image to effectively store a large amount of driving images.

The image capturer 120 may provide a driving image captured before an image capturing initiation command as well as a driving image captured after the image capturing initiation command. The image capturer 120 stores recently captured images and when a driving image capturing is initiated, provides the stored image to the processor 160. That is, the image capturer 120 may provide driving images captured before/after an image capturing initiation command.

The image capturer 120 may store images in a First In First Out (FIFO) method. That is, the images are managed such that when a new image is input, the previously acquired image is deleted and the newly input image is stored. For example, the image capturer 120 may store driving images of the vehicle 10 captured only for the last 15 secs.

Since the image capturer 120 stores the recent captured images, even if a user inputs a driving image collection command late, the image capturer 120 may provide a driving image desired to be recorded by the user.

Referring again to FIG. 2, the processor 160 controls the image capturer 120 to acquire a driving image and acquire additional information related to the acquired driving image.

The initiation and termination of the image capturing may be performed by a user's input through the input 80 or the speech recognizer 110. However, without a user's input, the image capturing may be initiated according to a preset condition.

According to an embodiment in the present disclosure, when a sign of vehicle abnormalcy is shown in the vehicle 10, the preset condition may be applied. In detail, the processor 160 monitors whether a sign of vehicle abnormalcy is shown in the vehicle 10. If a sign of vehicle abnormlacy is detected, the processor 160 determines that the preset condition is applied in the vehicle 10 and acquires a driving image. In this case, the processor 160, while acquiring the driving image, may also acquire an image that is captured before the sign of vehicle abnormalcy is shown and stored in the image capturer 120.

According to another embodiment in the present disclosure, a preset condition may be applied depending on a setting condition provided by a user. For example, when the vehicle 10 enters an area that is set by a user, an event may occur after an elapse of a predetermined period of time that is set by a user.

The processor 160 may acquire additional information related to a driving image. The additional image may include at least one of image capturing environment information about an environment in which the driving image is captured and vehicle state information about a state in which the driving image is captured.

The image capturing environment information may include at least one of an image capturing location in which the driving image is captured and an image capturing time in which the driving image is captured. The processor 160 may acquire the image capturing location information or the image capturing time information by using a navigation system provided at the vehicle 10. However, the method of acquiring the image capturing environment information is not limited thereto. For example, the image capturing environment information may be acquired from an electronic control unit (ECU) or various sensors provided on the vehicle 10, or may be received from an apparatus outside the vehicle 10 through the communicator 150.

The vehicle state information includes at least one of weather information, surrounding area traffic information, a revolutions per minute (RPM) of an engine, a state of a transmission, a vehicle speed, an on/off state of a lamp, the temperature of coolant, fuel information, travel distance information and tire pressure and oil state information. The processor 160 may acquire the vehicle state information from at least one sensor or the ECU provided on the vehicle 10.

The additional information may be input by the user. The method of inputting the additional information is not limited. For example, the user may input the additional information through user's speech. According to an embodiment in the present disclosure, the additional information may be a voice memo of a user input through a speech receiver. According to another embodiment in the present disclosure, the additional information may be a text memo obtained by recognizing a user's speech through the speech recognizer 110.

The acquiring of the additional information may be performed at the time of termination of the acquiring of the driving image, or at the same time of the acquiring of the driving image.

The processor 160 may store the driving image and the additional information. The driving image and the additional information may be stored in an image database 131. The processor 160 may perform tagging on each driving image to distinguish a plurality of driving images from each other. For example, the processor 160 may perform tagging on the driving image by using the image capturing environment information, such as the image capturing location or the image capturing time.

Figure 7:
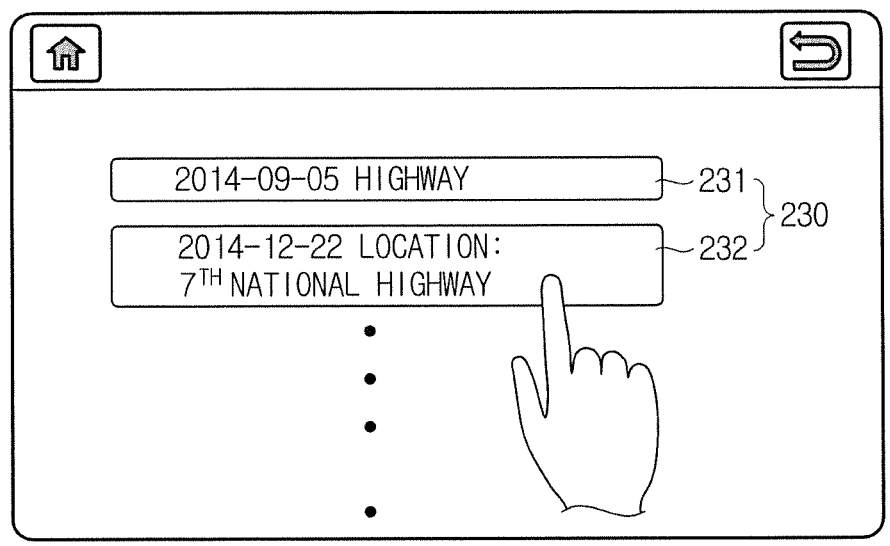
FIG. 7 is a view illustrating an example of a display screen on which a list of driving images of a vehicle is displayed.
Figure 8:
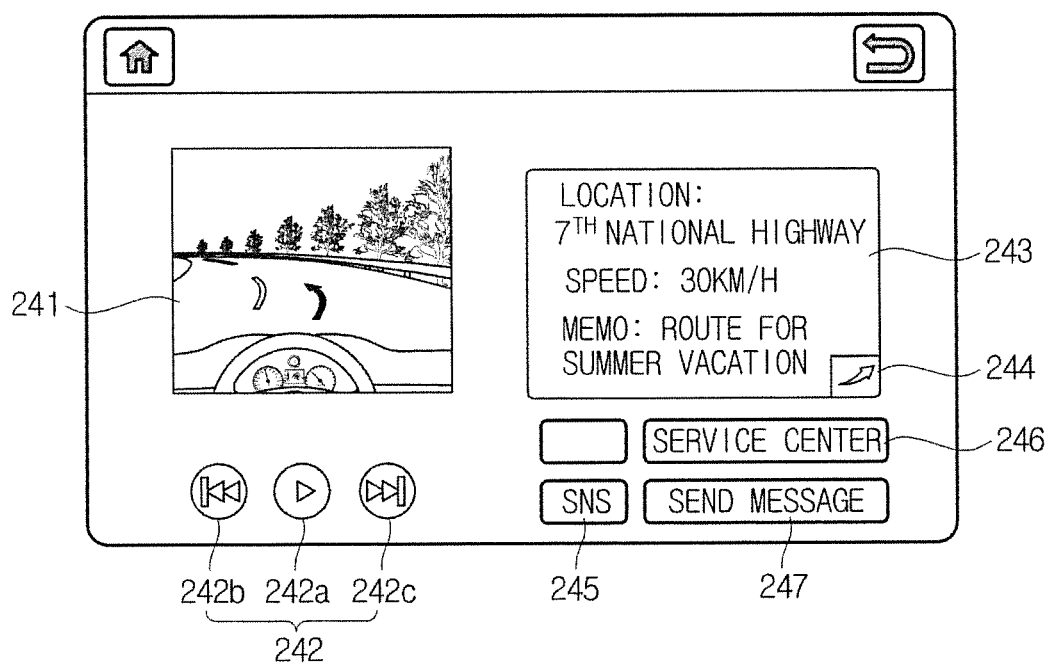
FIG. 8 is a view illustrating an example of a display screen for providing a driving image of a vehicle and additional information.
Figure 9:
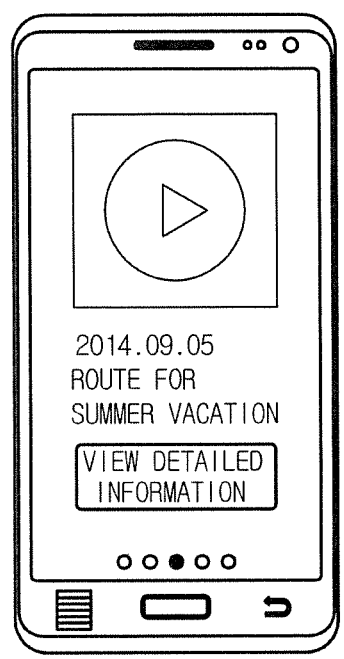
FIG. 9 is a view illustrating an example of a user terminal for providing a driving image of a vehicle and additional information.

FIG. 7 is a view illustrating an example of a display screen on which a list of driving images is displayed; FIG. 8 is a view illustrating an example of a display screen for providing a driving image and additional information; and FIG. 9 is a view illustrating an example of a user terminal for providing a driving image of a vehicle and additional information.

Referring to FIGS. 7 and 8, the processor 160 may provide a user with stored driving images. The processor 160 searches for a driving image stored in the storage 130.

When a plurality of driving images are found, the processor 160 may generate a list of driving images 230, and display the list of driving images 230 as shown in FIG. 7. Each item of the driving images 231 and 232 may be displayed with tagging information. For example, when the driving images are tagged by the image capturing date and the image capturing place, each item of the driving images 231 and 232 may display information about the image capturing date and information about the image capturing place.

When one item is selected in the list of driving images, the processor 160 may provide the selected driving image and additional information related to the selected driving image. Referring to FIG. 8, a content providing screen includes a driving image display region 241 and an additional information display region 243. On the driving image display region 241, a driving image is displayed, and on the additional information display region 243, additional information is displayed.

Replay of a driving image may be adjusted by a control icon 242. In detail, the driving image is played when a replay icon 242a is selected, a replay point moves forward when a fast forward icon 242c is selected, and the replay point moves backward when a rewind icon 242b is selected.

When a driving image is displayed, a voice memo may be played together with the playing of the driving image, or additional information about a user may be represented in the form of a subscription on the driving image.

The additional information may be selectively displayed. Since the size of the additional information display region 243 is limited, additional information may be selectively displayed. For example, the additional information display region 243 may only display the driving place, the driving speed and a user input memo, without displaying other additional information.

In order to display the additional information that is not displayed, the additional information display region 243 may be provided at one side thereof with an enlargement icon 244. When the enlargement icon 244 is selected, the size of the additional information display region 243 is enlarged, so that all pieces of additional information may be displayed.

The content providing screen may further include icons 245, 246 and 247 to transmit a driving image and additional information, for example, a social network service (SNS) upload icon 245 to upload a driving image to a previously registered SNS server, a transmission icon 246 to transmit a driving image to a previously registered service center and a message transmission icon 247 to transmit a driving image to a previously registered user terminal.

As shown in FIG. 9, the driving related contents may be transmitted to an external apparatus, and provided through the external apparatus.

A driving image and additional information may be transmitted to a predetermined external apparatus without a user's input. For example, when a sign of vehicle abnormalcy is indicated in the vehicle 10, a driving image and additional information may be transmitted to a predetermined service center server without an additional manipulation of a user.

In addition, the processor 160 may edit and transmit a driving image and additional information. In many cases, the allowable size or format of a driving image and additional information may be limited according to a characteristic of an external apparatus. Accordingly, the processor 160 may edit and transmit the driving image and additional information according to the characteristic of the external apparatus. For example, when an external apparatus stores an image having a size of 10 MB or below, the processor 160 edits a driving image to have a size of 10 MB or below and transmits the edited driving image.

The storage 130 may store data related to a driving of the vehicle 10. The storage 130 may include a Hard Disc, a Flash Memory, a High-Speed Random Access Memory, SRAM, DRAM, and Read-Only Memory (ROM), but the implementation of the storage 130 is not limited thereto.

In addition, the storage 130 may be detachably provided at the vehicle 10. For example, the storage 130 may include a Compact Flash Card (CF CARD), Secure Digital Card (SD Card), Smart Media Card (SM Card), Multimedia Card (MMC) or Memory Stick, but the implementation of the storage 130 is not limited thereto.

In addition, the storage 130 may further include the image database 131 to storage the driving image. The image database 131 may store a driving image and additional information acquired together with the driving image and mapped to the driving image. The image database 131 may search for a certain driving image according to control of the processor 160 and output the found driving image.

The communicator 150 transmits and receives data from/to the external apparatus. In detail, the communicator 150 may be connected to the external apparatus to transmit a driving image and additional information to the external apparatus.

The communicator 150 may include at least one of a wired communication module 151, a wireless communication module 152 and a short range communication module 153. The wired communication module 151 may connect the communicator 150 to an external apparatus through a wired communication method, such as Peripheral Component Interconnect (PCI), PCI-express, and Universe Serial Bus (USB).

The wireless communication module 152 may connect the communicator 150 to an external apparatus through a wireless communication method. For example, the wireless communication module 152 may connect the communicator 150 to a communication network through a wireless communication scheme, such as GSM/3 GPP based communication schemes, for example, GSM, HSDPA, LTE advanced, 3GPP2 based communication schemes, for example, CDMA, Wimax or global positioning system (GPS).

The short range communication module 153 may connect the communicator 150 to an external apparatus by using a short range communication method. For example, the short range communication module 153 may connect the communicator 150 to an external apparatus through a short range communication method, such as bluetooth, bluetooth low energy, infrared data association (IrDA), Zigbee, Wi-Fi, Wi-Fi direct, Ultra Wideband (UWB) or near field communication (NFC).

Figure 10:
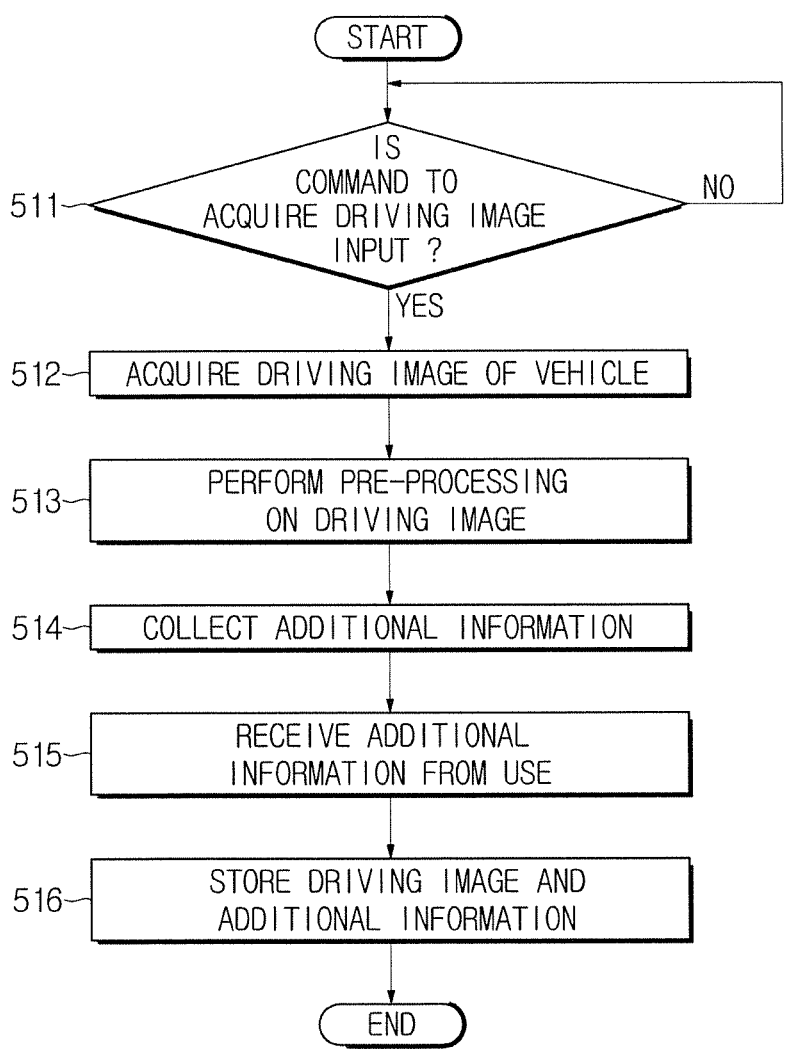
FIG. 10 is a flowchart showing a method of controlling a vehicle in accordance with an embodiment in the present disclosure.

FIG. 10 is a flowchart showing a method of controlling a vehicle in accordance with an embodiment in the present disclosure.

Referring to FIGS. 3 and 10, the vehicle 10 determines whether a driving image acquisition command is input (511). A user may manipulate the input 80. In addition, the user may easily input a driving image acquisition command by using speech recognition.

When a driving image acquisition command is input (YES from operation 511), the vehicle 10 acquires a driving image (512). In detail, the vehicle 10 may acquire a front image of the vehicle 10 on driving by using the front camera 121, a rear image of the vehicle 10 on driving by using the rear camera 122, a side image of the vehicle 10 on driving by using the side camera 123, or an image of the vehicle 10 on driving by using the camera provided at the black box. The vehicle 10 may simultaneously acquire a plurality of driving images by using a plurality of cameras, or may acquire a driving image selected by a user.

The vehicle 10 may provide the user with the acquired driving image in real time as shown in FIG. 6.

The vehicle 10 may perform a pre-processing on the driving image (513). In detail, the vehicle 10 may remove noise from the driving image of the vehicle 10, or calibrate screen image distortion generated on the driving image of the vehicle 10. In addition, the vehicle 10 may convert a driving image file into a preset format, or perform an image compression on driving image file to effectively store a large amount of driving images.

The vehicle 10 collects additional information (514). The vehicle 10 acquires at least one of image capturing environment information about an environment in which the driving image of the vehicle is captured and vehicle state information about a state in which the driving image of the vehicle is captured. The additional information may be acquired through a sensor provided at the vehicle 10, an electronic control unit (ECU) of the vehicle 10 or navigation system, but the method of acquiring additional information is not limited thereto. For example, the vehicle 10 may receive a predetermined piece of information from an apparatus outside the vehicle 10, to acquire additional information.

The vehicle 10 may receive additional information from a user (515). A user may input additional information through the input 80 or using a user's voice. For example, a user may store additional information in the form of a voice memo, or may store text memo from the user's voice by using speech recognition.

The vehicle 10 stores a driving image and additional information (516). The driving image is tagged and stored so as to be distinguished from other driving images. Information used for tagging is not limited. For example, image capturing environment information, such as an image capturing location or an image capturing time, may be used to facilitate distinguishing a driving image from other driving images.

The stored driving image and additional information may be provided through the vehicle 10, or may be transmitted to an external apparatus. Hereinafter, a case of providing a driving image of a vehicle in accordance with an embodiment of the present disclosure will be described in detail with reference to FIG. 11.

Figure 11:
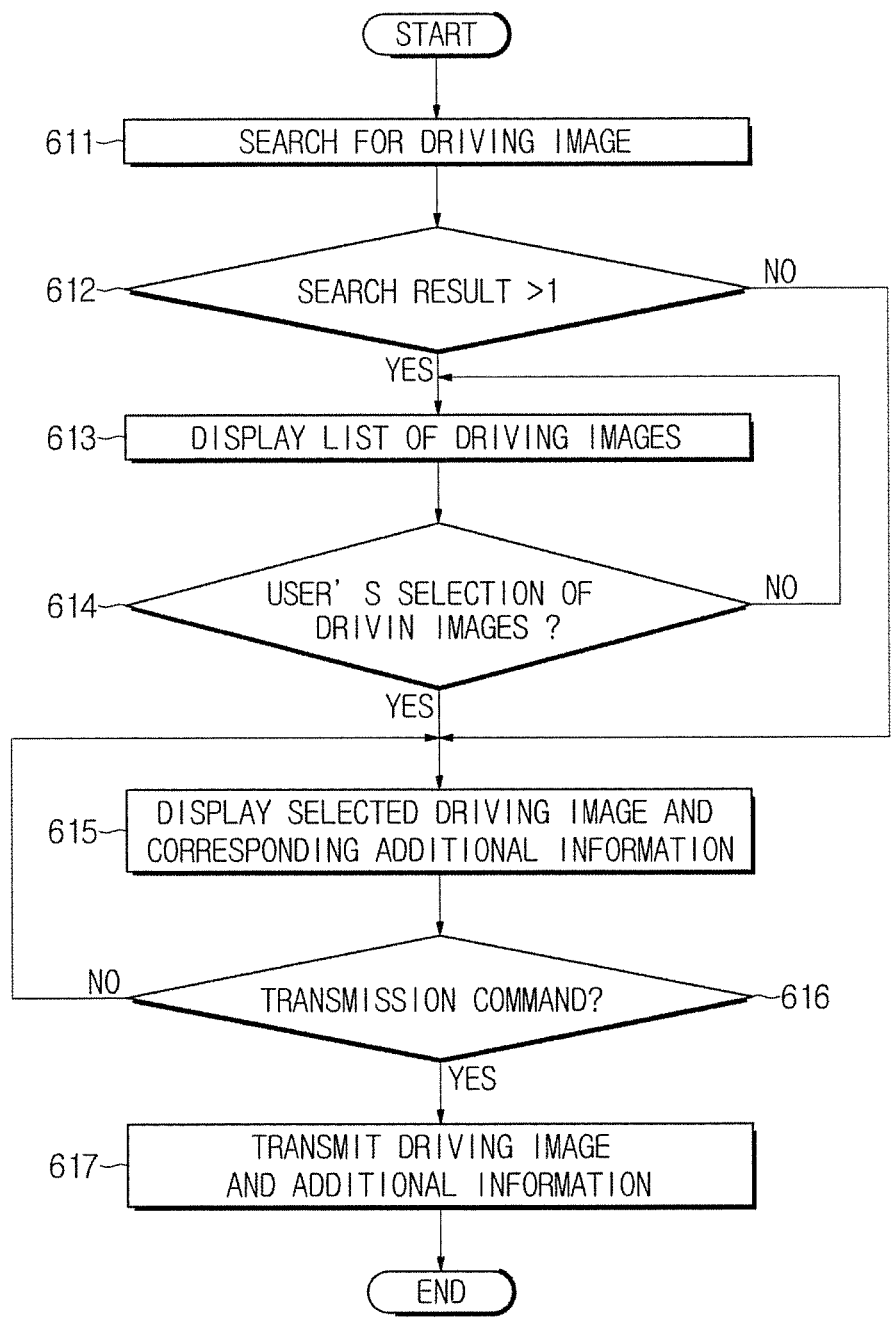
FIG. 11 is a flowchart showing a case of providing a driving image of a vehicle in accordance with an embodiment in the present disclosure.

FIG. 11 is a flowchart showing a case of providing a driving image of a vehicle in accordance with an embodiment in the present disclosure.

Referring to FIG. 11, the vehicle 10 searches for a driving image (611), and determines whether the found driving image is plural (612). If the found driving image is not plural (NO from operation 612), the vehicle 10 selects the found driving image, and operation branches to operation 615.

If the found driving image is in plural (YES from operation 612), the vehicle 10 displays a list of driving images (613). The list of driving images may be displayed together with tagged information as shown in FIG. 6.

The vehicle 10 determines a user's selection of driving images (614). A user may select one item from a plurality of items of driving images included in the list of driving images. The selection of a driving image may be performed through the input 80, or through a touch on the display 200. In addition, the user may select an item through speech recognition.

The vehicle 10 displays the selected driving image and additional information corresponding to the driving image (615). The driving image may be displayed together with stored additional information. In case, only a part of the additional information may be displayed, and when the additional information includes a voice memo of a user, the driving image may be provided together with the user's voice memo.

The vehicle 10 determines a user's input of a transmission command (616). A user may input a transmission command by manipulating the input 80 or by touching the display 200. In addition, the transmission command may be input by speech recognition.

When a transmission command is input (YES from operation 616), the vehicle 10 transmits the driving image and the additional information (617). Since the allowable size or format of a driving image and additional information may be limited according to a characteristic of an external apparatus. Accordingly, the vehicle 10 may edit and transmit the driving image and additional information according to the characteristic of the external apparatus. For example, when the vehicle may edit a driving image file to have a designated format, and transmit the edited driving image.

Figure 12:
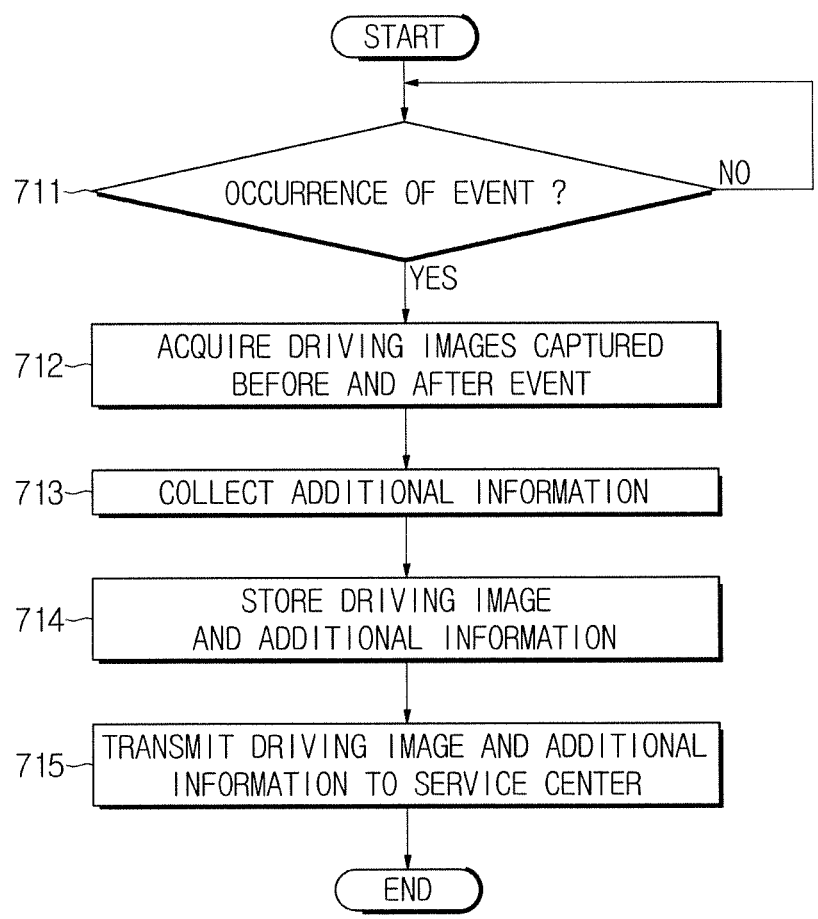
FIG. 12 is a flowchart showing a method of controlling a vehicle in accordance with another embodiment in the present disclosure.

FIG. 12 is a flowchart showing a method of controlling a vehicle in accordance with another embodiment in the present disclosure. A driving image and additional information may be automatically stored when a predetermined event occurs. In this case, the event may be set by a user, or may be previously set when the vehicle 10 is manufactured. Hereinafter, the following description will be made in relation to a method of controlling a vehicle when a sign of vehicle abnormalcy corresponds to a preset condition.

Referring to FIG. 12, the vehicle 10 determines occurrence of an event (711). The vehicle 10 monitors whether a sign of vehicle abnormalcy is shown, and if a sign of vehicle abnormalcy is detected, the vehicle 10 determines that an event has occurred. The sign of vehicle abnormalcy may be detected by various sensors or ECU provided at the vehicle 10, but the detection of the sign of vehicle abnormalcy may be implemented in various manners.

When an event occurs (YES from operation 711), the vehicle 10 acquires driving images captured before and after the event (712), and collects additional information (713). In detail, the vehicle 10 stores recent driving images, and when an event occurs, acquires the stored recent driving image as well as a captured driving image.

The vehicle 10 stores the driving image and additional information (714). In this case, a user may store information about a sign of vehicle abnormalcy in the form of a voice memo.

The vehicle 10 transmits the driving image and additional information to a service center (715). The service center to which the driving image and additional information are transmitted may be previously registered. As described above, when a sign of vehicle abnormalcy is shown, a driving image and additional information are automatically stored, so that inspection and maintenance of the vehicle 10 can be easily performed. In addition, since the driving image and additional information are transmitted to the service center, the vehicle 10 can be managed in a remote site.

As is apparent from the above, the driving image of the vehicle is provided together with additional information, so that the usability of the image of the vehicle can be improved.

In addition, the driving image of the vehicle and the additional information are transmitted to an external apparatus, so that information related to the vehicle can be effectively shared.

In addition, the driving image of the vehicle and additional information are stored when a sign of vehicle abnormalcy is indicated, so that inspection and maintenance of the vehicle can be easily performed.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
    an image capturer configured to acquire a driving image of a surrounding environment of the vehicle;
    a processor configured to acquire additional information related to the driving image, store the driving image and the additional information, and perform tagging on the driving image by using the additional information;
    a microphone configured to receive the additional information through user's speech;
    a speech recognizing processor configured to receive a speech and recognize a control command from a user;
    a display configured to provide a user with the driving image with the tagged additional information; and
    a communicator configured to transmit the driving image with the tagged additional information to an external apparatus;
    wherein the processor controls the acquiring of the driving image according to a result of speech recognition of the speech recognizing processor, performs tagging on the driving image with a voice memo received from the microphone, edits the driving image associated with the voice memo, and transmits the edited driving image associated with the voice memo to the external apparatus.

2. The vehicle of claim 1, wherein the image capturer includes at least one of a front camera acquiring a front view image of the vehicle, a rear camera acquiring a rear view image of the vehicle, a side camera acquiring a side view image of the vehicle, and a black box camera for the vehicle.

3. The vehicle of claim 1, wherein the additional information includes at least one of image capturing environment information about the surrounding environment in which the driving image is captured and vehicle state information about a state in which the driving image is captured.

4. The vehicle of claim 3, wherein the image capturing environment information includes at least one of a location in which the driving image is captured and a time in which the driving image is captured.

5. The vehicle of claim 3, wherein the vehicle state information includes at least one of a revolutions per minute (RPM) of an engine, a state of a transmission, a vehicle speed, an on/off state of a lamp, a temperature of coolant, fuel information, travel distance information, a tire pressure, and oil state information.

6. The vehicle of claim 1,
wherein the processor stores the speech of the user received through the microphone together with the driving image.

7. The vehicle of claim 1, wherein the processor monitors a sign of abnormalcy in the vehicle, and
wherein when the sign of abnormalcy is detected, the processor captures the driving image of the vehicle.

8. The vehicle of claim 7, wherein the processor transmits the driving image and the additional information to a service server.

9. The vehicle of claim 1,
wherein the communicator comprises at least one of a wired communication module, a wireless communication module and a short range communication module.

10. The vehicle of claim 1, wherein the voice memo is played together with the driving image when the driving image associated with the voice memo is selected.

11. The vehicle of claim 1, wherein the processor edits the driving image displaying the tagged additional information and transmits the edited driving image displaying the tagged additional information to the external apparatus.

12. A vehicle comprising:
an image capturer configured to capture a driving image of the vehicle when a sign of abnormalcy is detected;
a processor configured to acquire additional information related to the driving image, store the acquired additional information together with the driving image, and perform tagging on the driving image by using the additional information;
a microphone configured to receive the additional information through user's speech;
a speech recognizing processor configured to receive a speech and recognize a control command from a user;
a display configured to provide a user with the driving image with the tagged additional information; and
a communicator configured to transmit the driving image with the tagged additional information to an external apparatus;
wherein the processor controls the acquiring of the driving image according to a result of speech recognition of the speech recognizing processor, performs tagging on the driving image with a voice memo received from the microphone, edits the driving image associated with the voice memo, and transmits the edited driving image associated with the voice memo to the external apparatus.

13. A method of controlling a vehicle, the method comprising steps of:
acquiring a driving image of a surrounding environment of the vehicle;
acquiring additional information related to the driving image;
recognizing the speech of the user;
initiating acquiring the driving image according to a result of the step of recognizing;
storing the driving image and the additional information;
performing tagging on the driving image by using the additional information,
displaying the driving image with the tagged additional information; and
transmitting the driving image with the tagged additional information to an external apparatus,
wherein the step of performing comprises tagging on the driving image with a voice memo recognized from the speech of the user,
wherein the step of transmitting comprises editing the driving image associated with the voice memo and transmitting the edited driving image associated with the voice memo to the external apparatus.

14. The method of claim 13, wherein the step of acquiring the driving image comprises at least one of steps of:
acquiring, by using a front camera, a front view image of a surrounding environment of the vehicle;
acquiring, by using a rear camera, a rear view image of the surrounding environment;
acquiring, by using a side camera, a side view image of the surrounding environment; and
acquiring an image of the vehicle on driving by using a black box camera provided in a black box.

15. The method of claim 13, wherein the step of acquiring the additional information comprises at least one of:
acquiring image capturing environment information obtained when the driving image is captured; and
acquiring vehicle state information obtained when the driving image is captured.

16. The method of claim 13, wherein:
the step of storing the driving image and the additional information comprises storing the received speech of the user together with the driving image.

17. The method of claim 13, further comprising steps of:
monitoring a sign of abnormalcy in the vehicle; and
initiating the capturing the driving image when the sign of abnormalcy is detected.

* * * * *